(12) United States Patent
Curry et al.

(10) Patent No.: US 9,415,470 B2
(45) Date of Patent: Aug. 16, 2016

(54) APPARATUS AND SYSTEM FOR REMOVING, REPLACING AND/OR REINSTALLING SPRINKLER HEADS

(71) Applicant: SprayRise Enterprise Partners, LLC, Grand Junction, CO (US)

(72) Inventors: Keith G. Curry, Grand Junction, CO (US); Charles A. Torline, Grand Junction, CO (US); Juan M. Adan, Grand Junction, CO (US)

(73) Assignee: SprayRise Enterprise Partners, LLC, Grand Junction, CO (US)

( * ) Notice: Subject to any disclaimer, the term of this patent is extended or adjusted under 35 U.S.C. 154(b) by 490 days.

(21) Appl. No.: 13/915,419

(22) Filed: Jun. 11, 2013

(65) Prior Publication Data

US 2013/0333217 A1 Dec. 19, 2013

Related U.S. Application Data

(60) Provisional application No. 61/660,380, filed on Jun. 15, 2012.

(51) Int. Cl.
| | |
|---|---|
| *B23P 6/00* | (2006.01) |
| *B05B 15/10* | (2006.01) |
| *B25B 13/50* | (2006.01) |
| *B23D 61/00* | (2006.01) |

(52) U.S. Cl.
CPC . *B23P 6/00* (2013.01); *B05B 15/10* (2013.01); *B23D 61/00* (2013.01); *B25B 13/5083* (2013.01); *Y10T 29/49428* (2015.01); *Y10T 29/49718* (2015.01); *Y10T 29/53913* (2015.01)

(58) Field of Classification Search
CPC ........... B23P 6/00; B23D 61/00; B05B 15/10; B05B 15/068; B25B 25/00; B25B 13/02; B25B 13/06; B25B 13/48; B25B 13/50; B25B 13/5008; B25B 13/5083; Y10T 29/49716; Y10T 29/49718; Y10T 29/53913; Y10T 29/49428
See application file for complete search history.

(56) References Cited

U.S. PATENT DOCUMENTS

| | | | | |
|---|---|---|---|---|
| 1,075,710 | A * | 10/1913 | Goodwin | F16B 35/005 411/393 |
| 4,788,894 | A | 12/1988 | Mitschele | |
| 5,037,238 | A | 8/1991 | Wait | |
| 5,213,016 | A | 5/1993 | Kah, Jr. | |
| 6,234,411 | B1 | 5/2001 | Walker et al. | |
| 6,237,450 | B1 * | 5/2001 | Cosenza | B25B 15/005 81/436 |
| 6,349,624 | B1 | 2/2002 | Fahringer | |
| 6,796,013 | B2 | 9/2004 | Melker et al. | |

(Continued)

*Primary Examiner* — Sarang Afzali
(74) *Attorney, Agent, or Firm* — Marsh Fischmann & Breyfogle LLP

(57) ABSTRACT

Apparatuses, systems and methods that facilitate the removal and/or reinstallation of sprinkler heads as part of performing repositioning, repair, replacement and/or the like of one or more sprinkler heads, such as pop-up sprinkler heads. One tool disclosed herein may be used to cut the ground surrounding a sprinkler head and then unscrew at least a retaining cap of the sprinkler head so as to remove the retaining cap and an inner housing from the ground. Another tool disclosed herein may be used to unscrew or otherwise rotate an outer casing of the sprinkler head so as to remove the outer casing from the ground. After any appropriate work or other tasks are performed in relation to the sprinkler head and/or irrigation line, the first and/or second tools can be used to reinstall/resecure the sprinkler head to the water line and at least partially below ground level.

12 Claims, 14 Drawing Sheets

(56) References Cited

U.S. PATENT DOCUMENTS

| | | |
|---|---|---|
| 6,871,795 B2 | 3/2005 | Anuskiewicz |
| 6,904,835 B2 * | 6/2005 | Dugan ................ B25B 13/5083 81/442 |
| D540,632 S * | 4/2007 | Wong .............................. D8/14 |
| 7,448,303 B2 * | 11/2008 | Sweat ................. B25B 13/5083 294/96 |
| 7,644,876 B2 | 1/2010 | Weis et al. |
| 8,915,168 B2 * | 12/2014 | Jeter, Jr. ............. B23B 51/0406 7/138 |
| 2010/0170072 A1 | 7/2010 | Elzey |
| 2011/0017781 A1 | 1/2011 | Nelson et al. |

* cited by examiner

APPARATUS AND SYSTEM FOR REMOVING, REPLACING AND/OR REINSTALLING SPRINKLER HEADS

CROSS REFERENCE TO RELATED APPLICATIONS

This application claims priority from U.S. Patent Application No. 61/660,380, entitled "SYSTEM AND METHOD FOR REMOVING, REPLACING AND/OR REINSTALLING SPRINKLER HEADS," and filed on Jun. 15, 2012, the entirety of which is hereby incorporated herein by reference as if set forth in full.

FIELD OF THE INVENTION

This invention generally relates to tools for use with sprinkler heads and, more particularly, to systems and methods that allow for the removal of one or more sprinkler heads from an in-ground location to facilitate the addition of riser tubes between the sprinkler head(s) and the underground irrigation line, repair of the sprinkler head(s), and the like.

BACKGROUND OF THE INVENTION

Current methods for watering lawns and/or gardens include underground irrigation systems fluidly interconnected to a number of sprinkler heads that are configured to spray water from the irrigation system over the lawns and/or gardens. For instance, pop-up sprinkler units or heads (e.g., stationary, gear-driven) are particularly convenient because they are embedded in the ground when not in use. Generally, a pop-up sprinkler head includes a cylindrical outer casing or body, a cylindrical inner tubular housing (e.g., stem, riser) concentrically mounted in the outer casing, a retaining cap threadably mounted onto the outer casing and which generally prevents the inner housing from being completely separated from the outer casing, and a spring that urges the inner housing back into the outer casing in the absence of a water pressure so that the top of the inner housing (e.g., adjacent the nozzle) is generally flush with the top of the retaining cap, among other components. The bottom of the outer casing includes an inlet that is fluidly interconnected to an irrigation or water line (e.g., tube, pipe) running underground underneath the sprinkler head.

Over time, the ground level often tends to rise with respect to a pop-up sprinkler head (e.g., due to thatch, twigs, and/or other debris falling onto the lawn and eventually settling down towards the roots of the grass). As a result, spray performance of the pop-up sprinkler head may be inhibited (e.g., due to the nozzle of the inner housing not being able to extend past the top of grass, debris falling into the nozzle or other portions of the sprinkler head, and the like). As a result, it is often necessary to remove the sprinkler head (i.e., both the inner housing and outer casing of the sprinkler head), secure (e.g., threadably) one or more riser tubes (e.g., nipples) to the inlet of the outer casing and/or to the underground water line, and then re-secure the sprinkler head to the water line so as to raise the level of the head with respect to the ground.

Addition of the riser tube(s) allows the inner housing nozzle to fully extend past the top of the grass and avoid decreased spray performance. However, removal of a pop-up sprinkler head, addition of one or more riser tubes, and then re-installation of the pop-up sprinkler head is often a time consuming and laborious process. For instance, current sprinkler head removal tools and systems limit the ability of sprinkler technicians and other personnel to efficiently remove and replace a large number of pop-up sprinkler heads in a time-efficient manner.

SUMMARY OF THE INVENTION

The present disclosure is directed to apparatus, systems and methods (i.e., utilities) that facilitate the removal and/or reinstallation of one or more sprinkler heads (e.g., pop-up sprinkler heads) from or into the ground, for instance as part of performing repositioning, repair, replacement and/or the like of the sprinkler heads. In one regard, the disclosed utilities may be used to remove a sprinkler head from the ground free of necessarily having to dig around the sprinkler head to gain access to the same. In another regard, the disclosed utilities may be used to remove and replace a plurality of variously sized sprinkler heads. For instance, each of the tools disclosed herein may be used with sprinkler heads having different retaining cap diameters, different outer casing diameters, and the like. In this regard, the disclosed tools may be considered somewhat "universal" tools. Once one or more sprinkler heads are removed using the utilities herein, any appropriate tasks such as the inclusion of riser tubes, repair of the sprinkler heads, etc. may be performed. The disclosed utilities may then be used to reinstall the sprinkler heads back into the ground so as to fluidly interconnect the same with an underground irrigation system.

In one aspect, an apparatus is disclosed for use with a sprinkler head mountable at least partially within the ground, where the sprinkler head having an outer casing, an inner tubular housing slidably mountable within the outer casing, and a retaining cap securable to the outer casing to limit separation of the inner housing from the outer casing. In this aspect, the apparatus includes a body having a first end, an opposed second end, an inner surface, and a substantially hollow cavity inside the inner surface. A minimum cross-dimension of the body increases along at least a portion of a length of a rotational axis of the apparatus in a direction towards the second end. The apparatus also includes a tool engaging element disposed adjacent the first end. The cavity is operable to receive the retaining cap via the second end and allow the retaining cap to contact the inner surface at a location disposed between the first and second ends so that rotation of the apparatus about the rotational axis via the tool engaging element effects rotation of the retaining cap.

The tool engaging element may be in the form of a socket (e.g., to receive a wrench or the like), a shaft or rod (e.g., for attachment to a handle or the like), and/or the like. In some arrangements, the apparatus may include one or more cutting members disposed adjacent the second end of the apparatus that may be used to cut or sever the earth around the sprinkler head as the apparatus is being moved (e.g., rotated) towards the retaining cap. In other arrangements, any appropriate gripping member(s) or components (e.g., rubber layer, knurled surface, etc.) may be disposed or formed on the inner surface of the body.

In one variation, a kit may include both the apparatus and a tool, where the tool includes a first end, an opposed second end, and an outer surface having a length that extends between the first and second ends. The outer surface of the tool is configured to be inserted into an inner cavity of the outer casing and contact an inner wall of the outer casing so that rotation of the tool about a rotational axis of the tool effects rotation of the outer casing. For instance, the tool may be used to remove the outer casing after the apparatus was used to remove the retaining cap (and in some cases an inner housing).

In another aspect, a method includes moving an open end of a first tool towards a retaining cap of a pop-up sprinkler head; receiving the retaining cap within a hollow cavity of the first tool via the open end; contacting an outer periphery of the retaining cap with an inner wall of the first tool at a contact location, the inner wall surrounding the hollow cavity; and rotating the first tool, during the contacting, to induce a corresponding rotation of the retaining cap relative to a mounting location in the ground.

Various refinements may exist of the features noted in relation to the various aspects. Further features may also be incorporated in the various aspects. These refinements and additional features may exist individually or in any combination, and various features of the aspects may be combined. In addition to the exemplary aspects and embodiments described above, further aspects and embodiments will become apparent by reference to the drawings and by study of the following descriptions.

DESCRIPTION OF THE DRAWINGS

For a more complete understanding of the present invention and further advantages thereof, reference is now made to the following Detailed Description, taken in conjunction with the drawings, in which:

FIG. 2b is a sectional view of the sprinkler head along the line 2b-2b of FIG. 2a.

FIG. 4b is a sectional view of the first tool along the line 4b-4b of FIG. 4a.

DETAILED DESCRIPTION

Reference will now be made to the accompanying drawings, which assist in illustrating the various pertinent features of the various novel aspects of the present disclosure. In this regard, the following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

Disclosed herein are utilities that facilitate the removal and/or replacement of sprinkler heads such as pop-up sprinkler units or heads for use in the addition of one or more riser tubes (e.g., nipples) so as to raise the sprinkler heads away in a direction away from the ground, repair of the sprinkler heads, and/or the like. One (e.g., a first) tool or apparatus disclosed herein may be used to cut or sever ground or earth surrounding a sprinkler head mounted in the ground and then unscrew or otherwise rotate at least a retaining cap of the sprinkler head so as to remove the retaining cap and an inner housing or riser of the sprinkler head from the ground and from an outer casing of the sprinkler head. In some arrangements, rotation of the first tool also unscrews the outer casing from at an underground water line. In the event that the outer casing remains in fluid interconnection with the water line, another (e.g., a second) tool or apparatus disclosed herein may be used to unscrew or otherwise rotate the outer casing so as to remove the outer casing from the ground. After any appropriate work or other tasks have been performed in relation to the sprinkler head and/or water line (e.g., adding riser tubes, repairing the sprinkler head, blowing out the water, line, etc.), the first and/or second tools can be used to reinstall/resecure the sprinkler head(s) (and/or new sprinkler heads) to the water line and at least partially below ground level. The tools may in some arrangements be included as part of a kit for use by sprinkler technicians or personnel.

Figure 1:
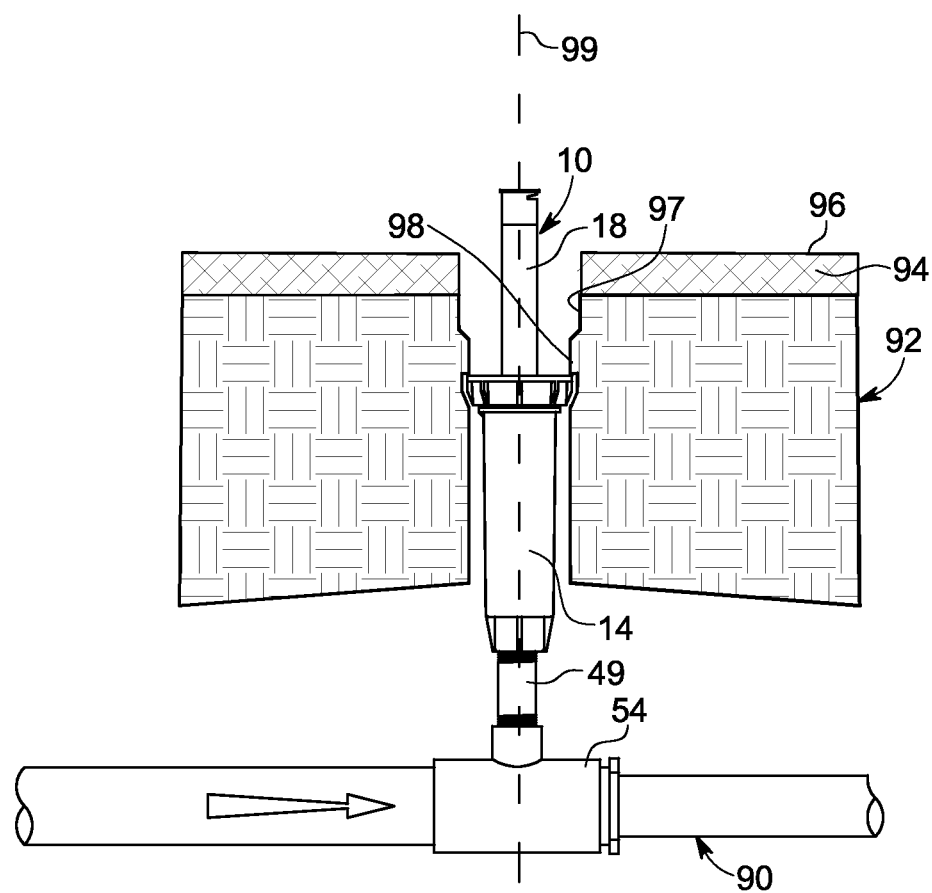
FIG. 1 is a side view of a pop-up sprinkler head fluidly interconnected to an underground water line and at least partially disposed below ground level.
Figure 2A:
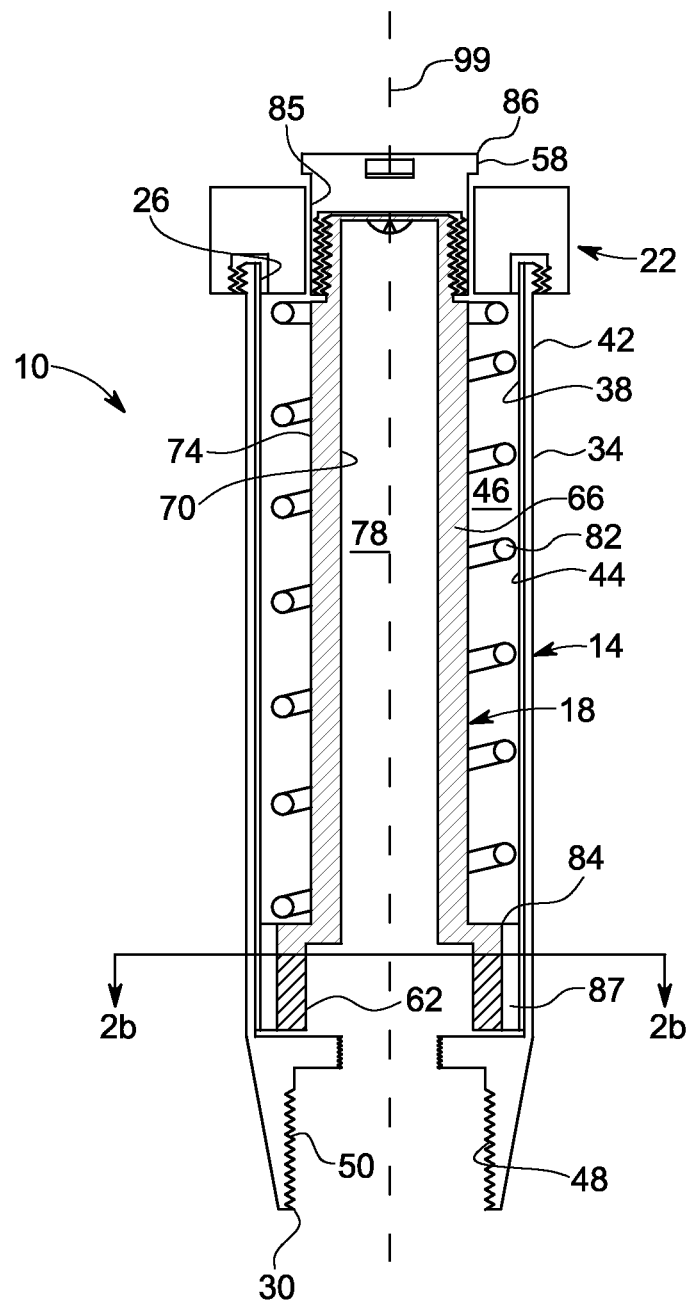
FIG. 2a is a sectional view of the pop-up sprinkler head of FIG. 1 taken along a central axis of the sprinkler head and with an inner housing of the sprinkler head in a retracted position.

Before discussing the disclosed embodiments in more detail, reference will initially be made to FIGS. 1-2a which illustrate one type of pop-up sprinkler head 10 with which the utilities disclosed herein may be used. It should be understood that the sprinkler head 10 in the figures has merely been shown to facilitate the reader's understanding of the disclosed embodiments and that the disclosed embodiments are not necessarily limited to use with the specific sprinkler head 10 shown.

Broadly, FIG. 1 shows the sprinkler head 10 being fluidly interconnected to an underground irrigation line or system 90 and at least partially mounted within the earth or ground 92, and FIG. 2a presents a sectional view of the sprinkler head 10. The sprinkler head 10 may generally include an outer casing 14 (e.g., an outer housing); an inner housing 18 (e.g., a riser) slidably or otherwise movably received within the outer casing 14 between a retracted, non-operational position (e.g., as shown in FIG. 2a) and an extended, operational position (as shown in FIG. 1); and a retaining cap 22 securable (e.g., threadable) to the outer casing 14 so as to limit removal of the inner housing 18 from the outer casing 14.

The outer casing 14 may generally include first and second opposed open ends 26, 30, a sidewall 34 having opposed inner and outer surfaces 38, 42 extending between the first and second ends 26, 30, and an internal or interior cavity 46 surrounded by the inner surface 38 between the first and second ends 26, 30 for slidably receiving the inner housing 18. The inner surface 38 of the outer casing 14 may include one or more alignment features such as fins 44 (e.g., splines, ribs) extending along a length of the outer casing 14 between the first and second ends 26, 30 for engaging with corresponding alignment features on a portion of the inner housing 18 for use in aligning the inner housing 18 within the interior cavity 46 and inhibiting relative rotation between the inner housing 18 and outer casing 14 as discussed below. An inlet 48 adjacent the second end 30 of the outer casing 14 may include any appropriate engagement feature or component such as threads 50 which may be configured to appropriately engage with corresponding threads (not shown) on a riser tube 49 or T-joint/fitting 54 or other component of the irrigation system 90 to allow for fluid flow between the irrigation system 90 and the interior cavity 46 of the outer casing 14.

The inner housing 18 may generally include first and second opposed ends 58, 62, a sidewall 66 having opposed inner and outer surfaces 70, 74 extending between the first and second ends 26, 30, and an internal or interior cavity 78 surrounded by the inner surface 70 between the first and second ends 58, 62 for receiving a flow of water therein or therethrough. The retaining cap 22 may be threaded or otherwise removably secured over the first end 26 and about the outer surface 42 of the outer casing 14 so as to capture a spring 82 between the outer surface 74 of the inner housing 18 and the inner surface 38 of the outer casing 14 so that one end of the spring 82 is disposed against the retaining cap 22 and another end of the spring 82 is disposed against a portion of the inner housing 18 (e.g., retaining ridge or flange 84). See FIG. 2a.

Figure 2B:
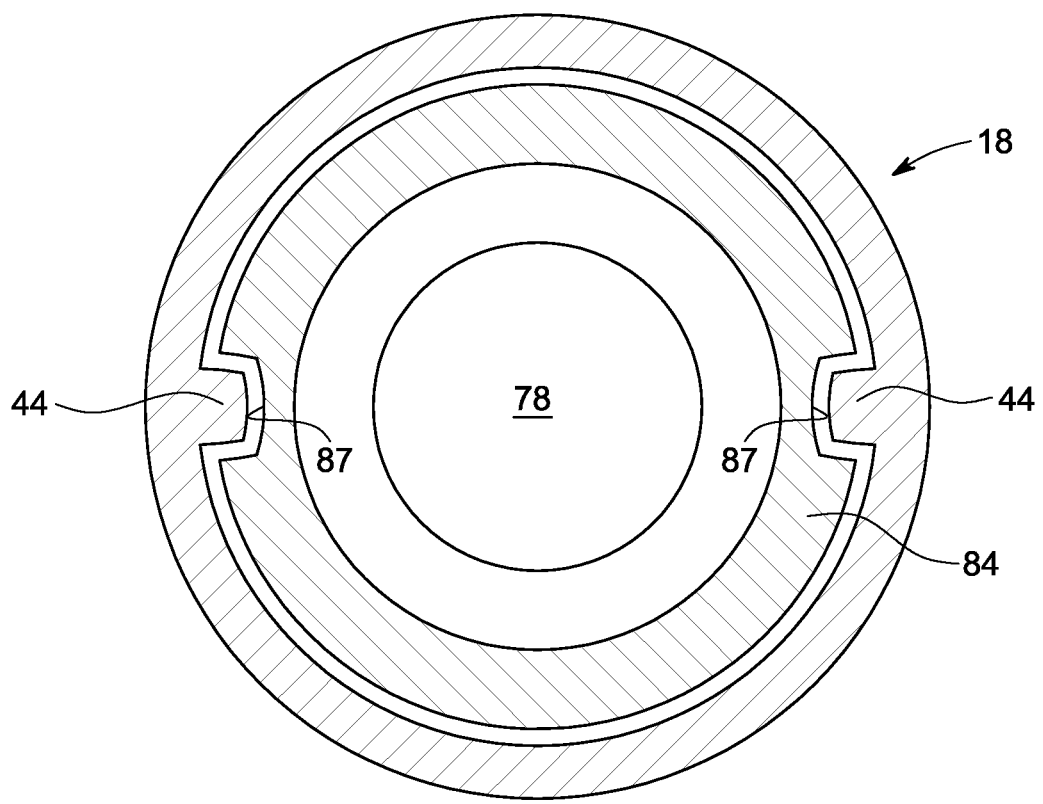

The inner housing 18 may be prevented or at least limited from being completely removed or separated from the outer casing 14 due to the presence of the spring 82 and the retaining ridge 84 when the retaining cap 22 is secured over the first end 26 of the outer casing 14. Further, the inner housing 18 may be prevented or at least limited from being rotated about a central axis 99 of the sprinkler head 10 due to engagement or contact between the alignment fins 44 on the inner surface 38 of the outer casing 14 and corresponding grooves or openings 87 on or in an outer periphery of the retaining flange 84. Also see FIG. 2b. In some arrangements grooves in the inner surface 38 of the outer casing 14 may be configured to engage with corresponding fins/splines on the outer periphery of the retaining flange 84 for alignment and anti-rotation purposes. In any event, the spring 82 may be configured to apply a spring force against the retaining flange 84 so as to urge the inner housing 18 into a retracted position (e.g., as shown in FIG. 2) in the absence of a water pressure so that the inner housing 18 is generally concealed from view and generally does not present an obstacle or hazard while walking over the sprinkler head 10, mowing over the sprinkler 10, or the like.

When the water pressure from the irrigation system 90 overcomes the force of the spring 82, the water pressure urges the inner housing 18 into an extended, operational position via an opening 85 in the retaining cap 22 (e.g., as shown in FIG. 1) so that water flows from the irrigation system 90 through the inlet 48 and interior cavity 78 of the inner housing 18 and out of a nozzle 86 adjacent the first end of the inner housing 18 so as to water a lawn 94 (e.g., or garden or the like). Specifically, the first end 58 of the inner housing 18 may be configured to protrude a distance above a top surface 96 the lawn 94, garden or the like to allow for adequate water coverage of the same via the nozzle 86. Once the water pressure from the irrigation system 90 has been shut off, the spring 82 urges the inner housing 18 back into the collapsed position.

While not shown, any appropriate sealing assembly may be disposed within and/or adjacent the inner housing 18 to prevent or at least limits water flow from the irrigation system 90 into the inner cavity 78 via the inlet 48 when the inner housing 18 is in the retracted position.

Over time, it sometimes becomes necessary to disconnect a sprinkler head (e.g., sprinkler head 10) from an irrigation system (e.g., irrigation system 90) or otherwise remove the sprinkler head from the ground for one of a number of reasons. One reason, of course, would be to perform repairs and/or maintenance on the sprinkler head 10, the irrigation system 90, the surrounding earth, and/or the like. Another reason may be to add one or more riser tubes between the irrigation system 90 and the sprinkler head 10 so as to raise the sprinkler head 10 in a direction away from the irrigation system 30 and allow the nozzle 86 of the inner housing 18 to at least substantially fully clear the top 96 of the lawn 94 or garden so as to adequately cover the same with water flowing out of the nozzle 86. As discussed previously, adding one or more riser tubes may be necessary when the relative positioning between the sprinkler head 10 and the ground level has changed over time (e.g., the distance between the lawn 94 and the retaining cap 22 has increased since the time at which the sprinkler head 10 was first installed or the sprinkler head 10 has otherwise sunk into the ground 92).

Figure 3:
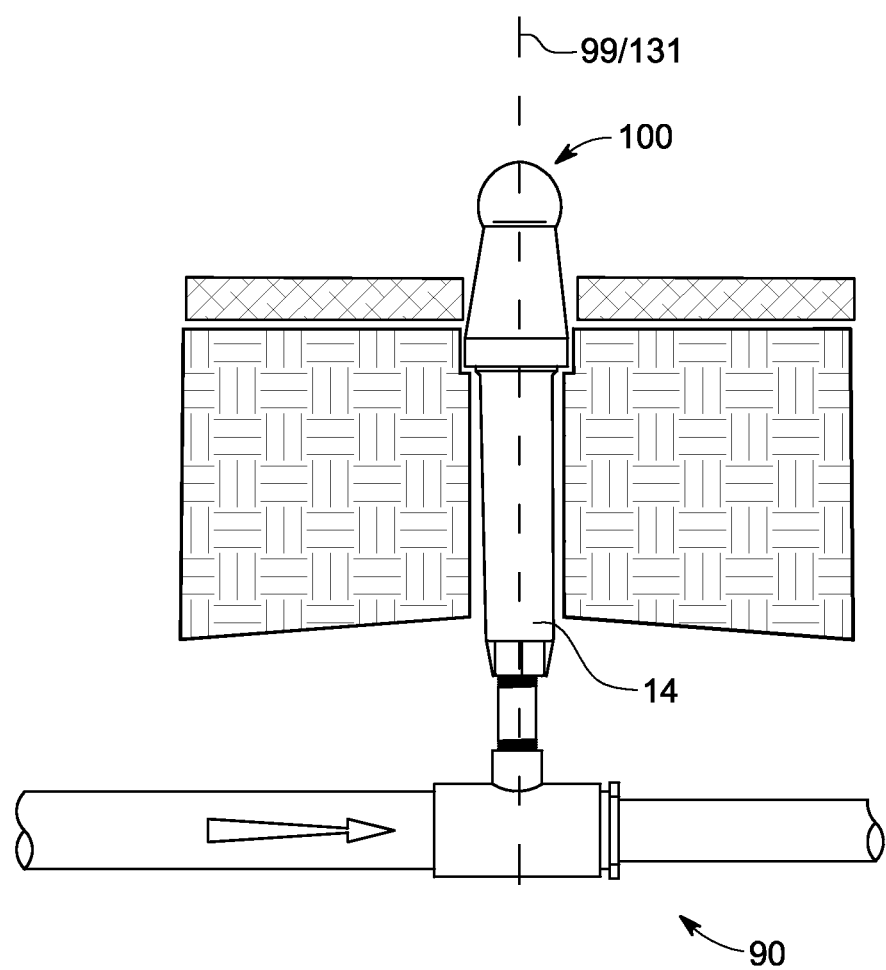
FIG. 3 is a side view of the pop-up sprinkler head similar to that in FIG. 1 but illustrating a first tool being aligned over and engaged with a retaining cap of the pop-up sprinkler head.
Figure 4A:
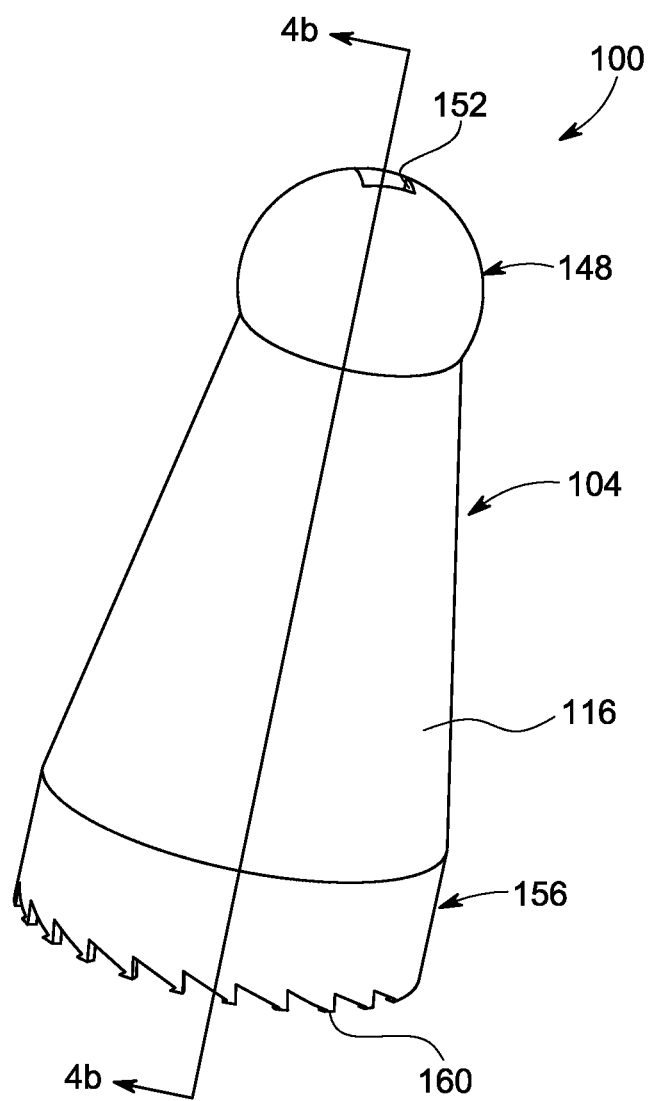
FIG. 4a is a perspective view of the first tool of FIG. 3.
Figure 4B:
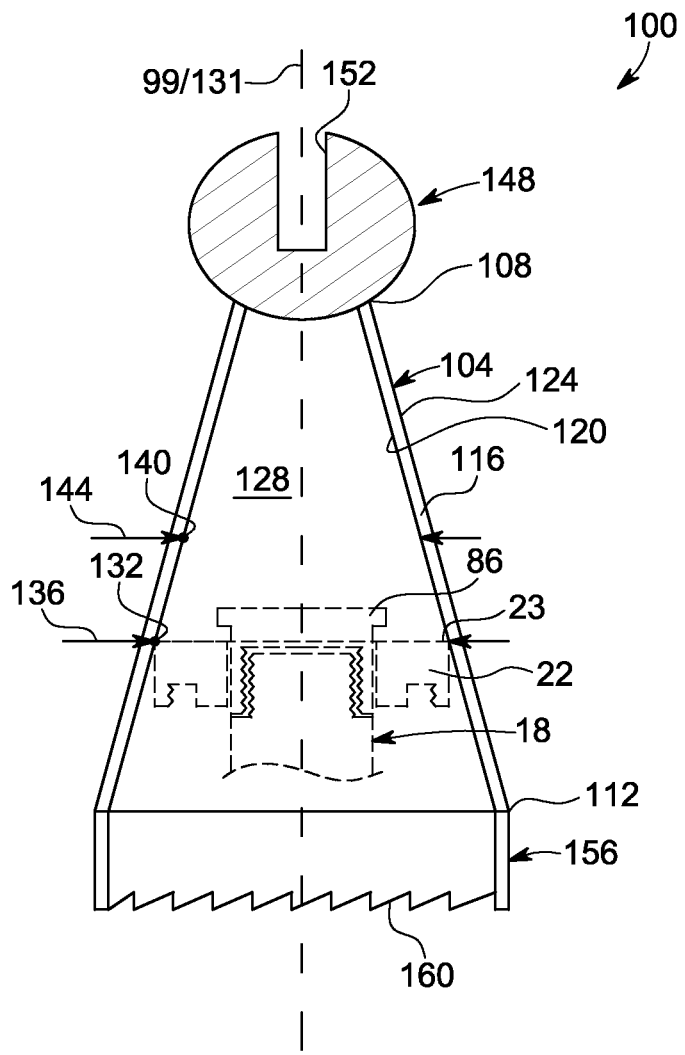

In this regard, and turning now to FIGS. 3-4b, a first tool or apparatus 100 is illustrated that may be used to disconnect at least a portion of the sprinkler head 10 (e.g., the retaining cap 22) from the irrigation system 90 or otherwise remove the portion from the ground 92. While the term "first" tool 100 will be used to differentiate the tool from additional tools that will be discussed herein later in this disclosure, it is to be understood that the additional tools need not necessarily be used in conjunction with the first tool 100 and vice versa. For instance, and as will be discussed, additional tools may not be needed in the event that the first tool 100 serves to remove the entire sprinkler head 10 from the ground 92.

In any case, the first tool 100 may generally include a body 104 having first and second opposed ends 108, 112, a sidewall 116 having opposed inner and outer surfaces 120, 124 extending between the first and second opposed ends 108, 112, and a hollow, interior cavity 128 inside of or otherwise surrounded by the inner surface 120. The interior cavity 128 is sized and configured to receive the retaining cap 22 (shown in phantom lines in FIG. 4b) of the sprinkler head 10 via the open second end 112 of the body 104 and allow the retaining cap 22 (e.g., an outer periphery 23 of the retaining cap 22) to contact and/or engage the inner surface 120 of the body 104.

For instance, and with respect to FIG. 3, the open second end 112 of the first tool 100 may be moved (e.g., by a sprinkler operator or technician grasping the body 104 adjacent the first end 108) towards the retaining cap 22 (not shown in FIG. 3) of the sprinkler head 10 (e.g., such as by moving a central or rotational axis 131 of the first tool 100 generally along or collinear with central axis 99 of sprinkler head 10) so as to receive the retaining cap 22 within the interior cavity 124 via the second end 112 and allow the outer periphery 23 of the retaining cap 22 to contact the inner wall 120 of the body 104 at a contact location 132. See FIG. 4b. As the body 104 may be configured to allow the outer periphery 23 to contact the inner surface 120 about a substantial entirety of the outer periphery 23, the contact location 132 may actually extend about a corresponding portion of the inner surface 120 of the body 104.

Figure 5:
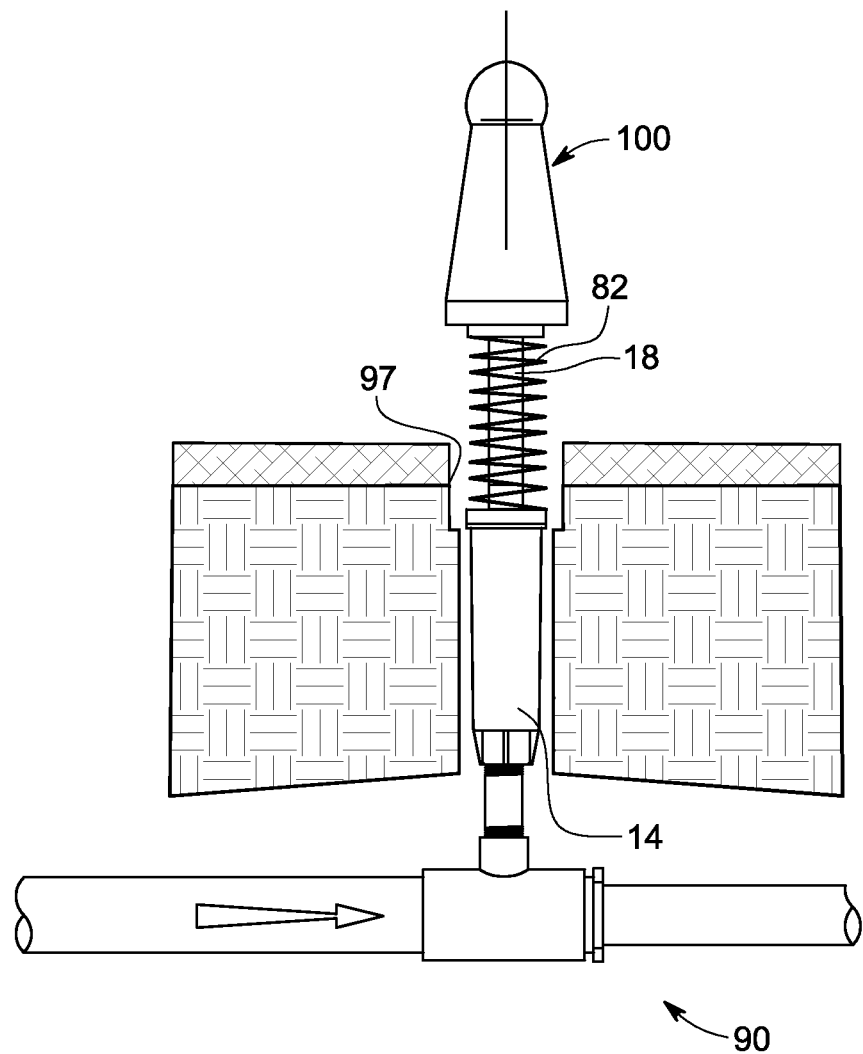
FIG. 5 is a side view of the pop-up sprinkler head and first tool similar to that in FIG. 3 but illustrating the first tool being used to remove the retaining cap and an inner housing of the pop-up sprinkler head from an outer casing of the pop-up sprinkler head.
Figure 6:
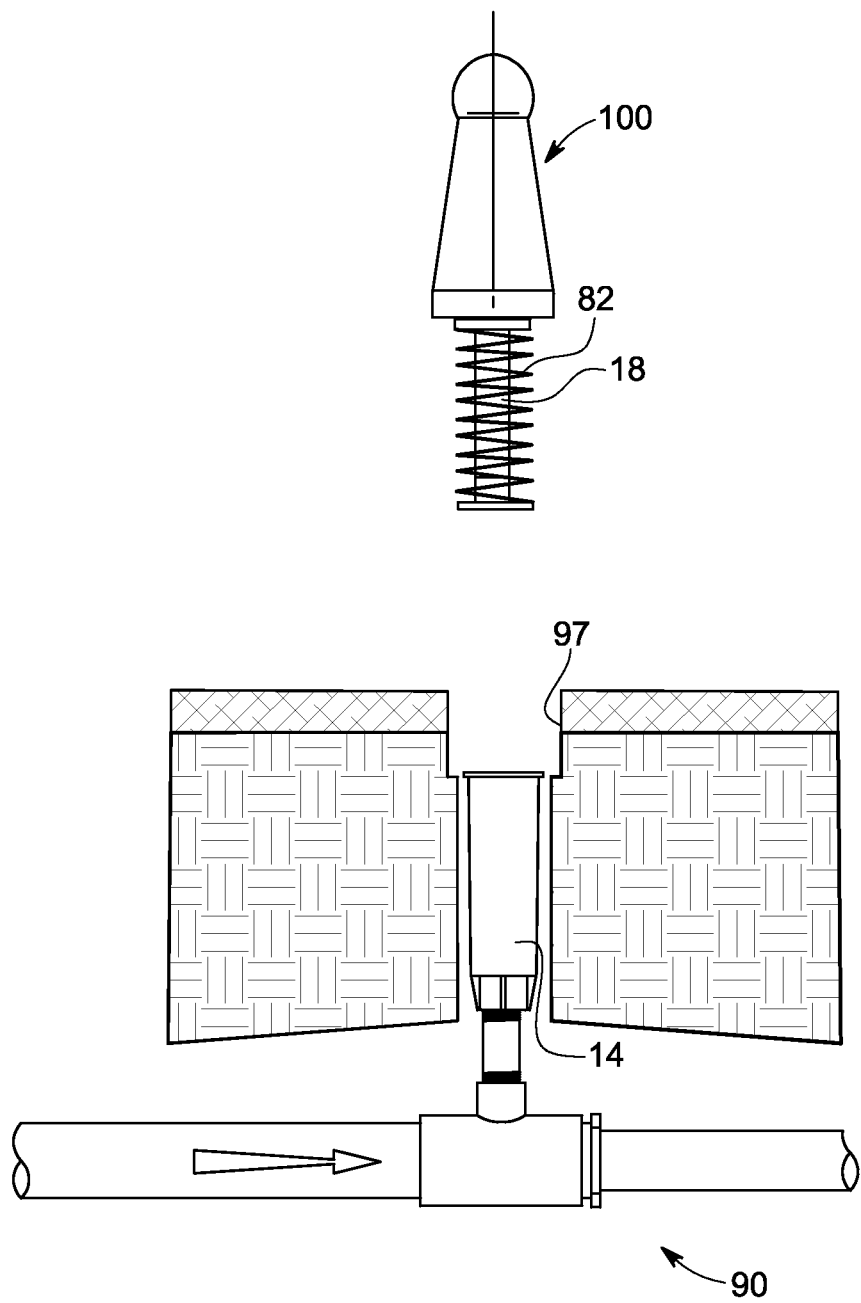
FIG. 6 is a side view of the pop-up sprinkler head and first tool similar to that in FIG. 5 but illustrating the first tool being used to remove the retaining cap and an inner housing of the pop-up sprinkler head from both the outer casing of the pop-up sprinkler head and the ground.
Figure 7:
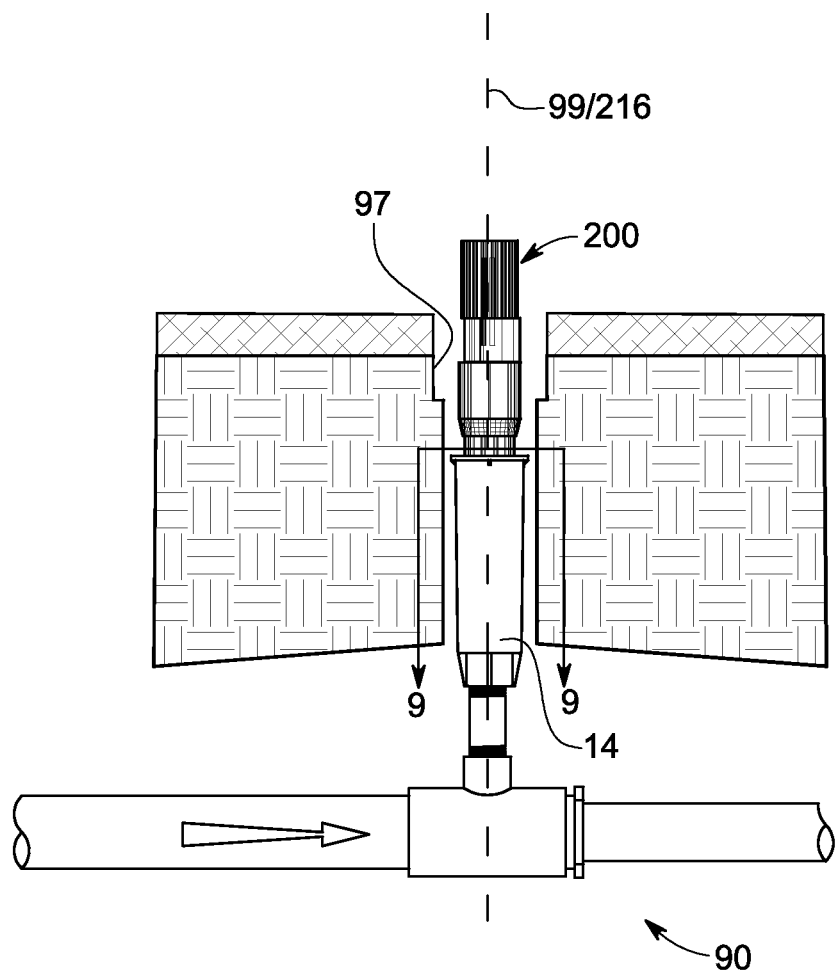
FIG. 7 is a side view of the outer casing of the pop-up sprinkler head similar to that in FIG. 6 but illustrating a second tool being aligned over and engaged with the outer casing.

The operator may then, while maintaining contact between the retaining cap 22 and the inner surface 120 (which may require application of at least a slight downward force against the first tool 100 in a direction generally towards the retaining cap 22), apply a torque to the first tool 100 to rotate the first tool 100 about the rotational axis 131 while the rotational axis 131 is generally collinear with the central axis 99 of the sprinkler head 10 to induce a corresponding rotation of the retaining cap 22 relative to the outer casing 14, the irrigation system 90 and the ground 92. For instance, the operator may use the first tool 100 to rotate the retaining cap 22 in a counterclockwise direction to unthread the retaining cap 22 from the outer casing 14. The inner housing 18 (including the spring 82, nozzle 86, etc.) may in some cases also be removed (e.g., slidably removed) from the interior cavity 46 of the outer casing 14 (e.g., along the fin(s) 44 on the inner surface 38) as the retaining cap 22 is being removed from the same. See FIGS. 5-6. In some arrangements, the operator may wedge the retaining cap 22 into the interior cavity 128 (e.g., via application of the downward force) so that lifting of the first tool 100 away from the ground 92 also lifts the retaining cap 22 (and inner housing 18, spring 82, etc.).

In some situations, such as when the retaining cap 22 and the outer casing 14 are (e.g., possibly inadvertently) locked together (e.g., such as when grit, debris or the like enters the threaded connection between the retaining cap 22 and the outer casing 14 to prevent relative rotation between the retaining cap 22 and the outer casing 14), rotation of the retaining cap 22 via the first tool 100 may also serve to induce a corresponding rotation of the outer casing 14 relative to the riser 49 and/or T-joint 54 of the irrigation system 54. In this case, continued rotation of the first tool 100 may cause the inlet 48 of the outer casing 14 to unthread from the irrigation system 90 and allow for complete removal of the sprinkler head 10 from the same. As will be discussed further below, any appropriate tasks can now be performed such as repair/replacement of the sprinkler head 10, the addition of one or more additional riser tubes 49 to the sprinkler head 10, T-joint 54 and/or any existing riser tubes 49, and/or the like.

To enhance friction of the inner surface 120 of the first tool 100 so as to prevent or at least limit movement (e.g., rotation) between the first tool 100 and the retaining cap 22 as a torque is being applied to the first tool 100 (and/or to wedge the retaining cap into the interior cavity 128), any appropriate gripping or slippage limiting component or arrangement (not shown) may be disposed or formed on or as part of the inner surface 120. In one arrangement, any appropriate polymer may be used to form the body 104 and/or added to at least a portion of the inner surface 120 (e.g., to become at least part of the inner surface 120) to limit slippage or rotation of the retaining cap 22 relative to the first tool 100 as the latter is being rotated by an operator or the like. For instance, a layer of rubber or the like may be appropriately adhered or otherwise secured to the inner surface 120 of the body 104 (e.g., so as to form the inner surface 120). As another example, any appropriate texturing, grooves or the like may be formed on or in the inner surface 120. Other arrangements are also envisioned.

To allow the first tool 100 to receive, contact and rotate retaining caps 22 of various diameters, a minimum cross-dimension of the body 104 (e.g., a minimum distance from one point on the inner surface 120 to an opposing point on the inner surface 120 through the interior cavity 128) may increase along at least a portion of a length of the rotational axis 131 of the first tool 100 in a direction towards the second end 112. Stated differently, at least a portion of the body may have a minimum cross-dimension that decreases along a path taken by a retaining cap 22 the retaining cap enters and moves into the interior cavity 128 of the first tool 100.

For instance, the first tool 100 may be in the form of a conically shaped member having an inner diameter that generally increases from first end 108 to or at least towards the second end 112 to allow each of a plurality of various sized retaining caps 22 to enter the interior cavity 128 of the body via the second end 112 and then contact the inner surface 120 at various different contact locations. In this regard, an outer diameter of the outer periphery 23 of each retaining cap 22 may generally be equal to an inner diameter of the body 104 at the particular contact location. With reference to FIG. 4b, the retaining cap 22 shown in phantom lines in and the body 104 at the contact location 132 may each generally have a diameter 136 (an inner diameter in the case of the body 104 and an outer diameter in the case of the retaining cap 22). As another example, the outer periphery 23 of another retaining cap 22 (not shown) may contact the inner surface 120 of the body 104 at another contact location 140 having a diameter 144 smaller than the diameter 136.

While the body 104 is illustrated as having a generally conical shape between the first and second ends 108, 112, other shapes of the body 104 are envisioned such as pyramidal and the like. Furthermore, while the inner surface 120 of the first tool 100 has been shown as substantially continuously increasing in diameter from the first end 108 towards the second end 112, it is envisioned that the inner surface 120 could in one arrangement have a plurality of steps, where each step includes a substantially constant minimum cross-dimension (e.g., a constant inner diameter). For instance, each of such steps could be sized to receive a correspondingly sized retaining cap 22 of a sprinkler head 10. Other arrangements are also envisioned and encompassed within the scope of the present disclosure.

For facilitating the ability to apply a torque to the first tool 100 so as to rotate a retaining cap 22 of a sprinkler head 100, the first tool 100 may include a tool engaging element 148 disposed generally adjacent the first end 108 of the body 104. As shown in FIGS. 4a-4b, the tool engaging element 148 may in one arrangement include a socket 152 that is appropriately sized and shaped to receive a tool such as a wrench. As merely one more example, the tool engaging element 148 may be in the form of a shaft (not shown) having one end connected to or adjacent the first end 108 of the body 104 and another end on which a handle (e.g., T-shaped) is disposed that may be manipulated (e.g., rotated) by an operator to induce a corresponding manipulation or rotation of the body 104 (and thus a retaining cap 22 within the body 104).

With brief reference back to FIG. 1, it is seen how the sprinkler head 10 is disposed within a hole 97 (e.g., bore, opening, etc.) extending through the ground 92 to the irrigation system 90. In this regard, an operator may be required to insert the first tool 100 at least partially into the hole 97 to allow the retaining cap 22 to be received in the interior cavity 128 of the first tool 100. In the event that the diameter (not labeled) of some portion of the hole 97 between the top 96 of the lawn 94 and the retaining cap 22 is less than an outer diameter (not labeled) of the first tool 100 adjacent the second end 112 of the body 104, the operator would be required to remove a portion (e.g., portion 98) of the ground 92 in order to enlarge the hole 97 and allow for insertion of the first tool 100. Some previous manners of enlarging the hole 97 to allow for general access to the sprinkler head 10 have included using a shovel or other type of tool to dig or otherwise form a large hole around the sprinkler head 10 that is often many times the size of the hole 97 within which the sprinkler head 10 already exists; however, doing so is time consuming, requires one or more separate tools, may cause an unsightly mess, and the like.

In this regard, the first tool 100 may also include a cutting element or member 156 disposed generally adjacent the second end 112 of the body 104 that may be used to cut or sever the ground 92 directly around the retaining cap 22 as the first tool 100 is being moved towards the retaining cap 22. As an example, the cutting member 156 may include a serrated blade in the form of a series of teeth 160 (e.g., such as a metallic saw blade or the like) disposed about a substantial entirety of a periphery of the second end 112 of the body 104 that generally protrudes in a direction away from the first end 108 of the body 104. In this regard, an operator may rotate the first tool 100 (e.g., via the tool engaging element 148) as the first tool 100 is being moved towards the retaining cap 22 to cut a portion 98 of the ground 92 with the cutting element 156 so as to enlarge the hole 97 and allow the body 104 to be moved over, receive and contact the retaining cap 22. In one arrangement, the operator may rotate the first tool 100 in a counterclockwise direction as the ground 92 is being cut by the cutting element 156 towards the retaining cap 22. Upon contact between the retaining cap 22 and the inner surface 120 of the body 104, the operator may thus just continue the same counterclockwise rotation of the first tool 100 to correspondingly unthread the retaining cap 22 from the outer casing 14 and allow for removal of the retaining cap 22 and inner housing 18 from the outer casing 14 (or in some situations, the removal of the entire sprinkler head 10, i.e., including the outer casing 14, from the irrigation system 90 and the ground 92).

In one variation, the diameter of the cutting element 156 may be substantially the same as the diameter of the body 104 adjacent the second end 112. As a result, the first tool 100 may advantageously be configured to receive retaining caps 22 of various diameters while at the same time be configured to cut a hole around a retaining cap 22 having a diameter that is only slightly larger than substantially the largest retaining cap 22 that the interior cavity 128 of the body 104 can receive so as to limit the time and effort associated with necessarily digging a hole around the sprinkler head 10.

In one arrangement, the minimum cross-dimension of the body 104 (e.g., inner diameter) adjacent the second end 112 may be at least about 1½", such as at least about 2", or at least about 2½"; and/or may be no more than about 4", such as no more than about 3½", or no more than about 3". In another arrangement, a height of the first tool 100 (e.g., measured along rotational axis 131 from the series of teeth 160 to a top of the tool engaging element 148, such as an entrance to socket 152) may be at least about 4", such as at least about 5", or at least about 5½"; and/or no more than about 7½", such as no more than about 6½", or no more than about 6".

In a further arrangement, the minimum cross-dimension of the body 104 adjacent the second end 112 may be at least about 3", such as at least about 3½", or at least about 4"; and/or may be no more than about 6", such as no more than about 5½", or no more than about 5". In a still further arrangement, a height of the first tool 100 may be at least about 6", such as at least about 7", or at least about 7½"; and/or no more than about 10", such as no more than about 9", or no more than about 8½".

As discussed previously, the outer casing 14 of a sprinkler head 10 may in some cases remain fluidly interconnected to the irrigation system 90 (e.g., to riser tube 49 and/or T-joint 54) after use of the first tool 100 (or other tool) to remove the retaining cap 22, inner housing 18, spring 82, etc. For instance, rotation of the retaining cap 22 via the first tool 100 may be relative to the outer casing 14 (e.g., via corresponding threads, see FIG. 2) such that the outer casing 14 remains in the ground 92 after use of the first tool 100. In this regard, and turning generally now to FIGS. 7-10, disclosed herein is a second tool 200 that may be used to disconnect an outer casing 14 from the irrigation system 90 and/or otherwise remove the outer casing 14 from the ground 92 (in addition to connecting/reconnecting the outer casing with the irrigation system 90 or otherwise mounting the outer casing 14 in the ground 92 as will be discussed in more detail below).

Figure 8:
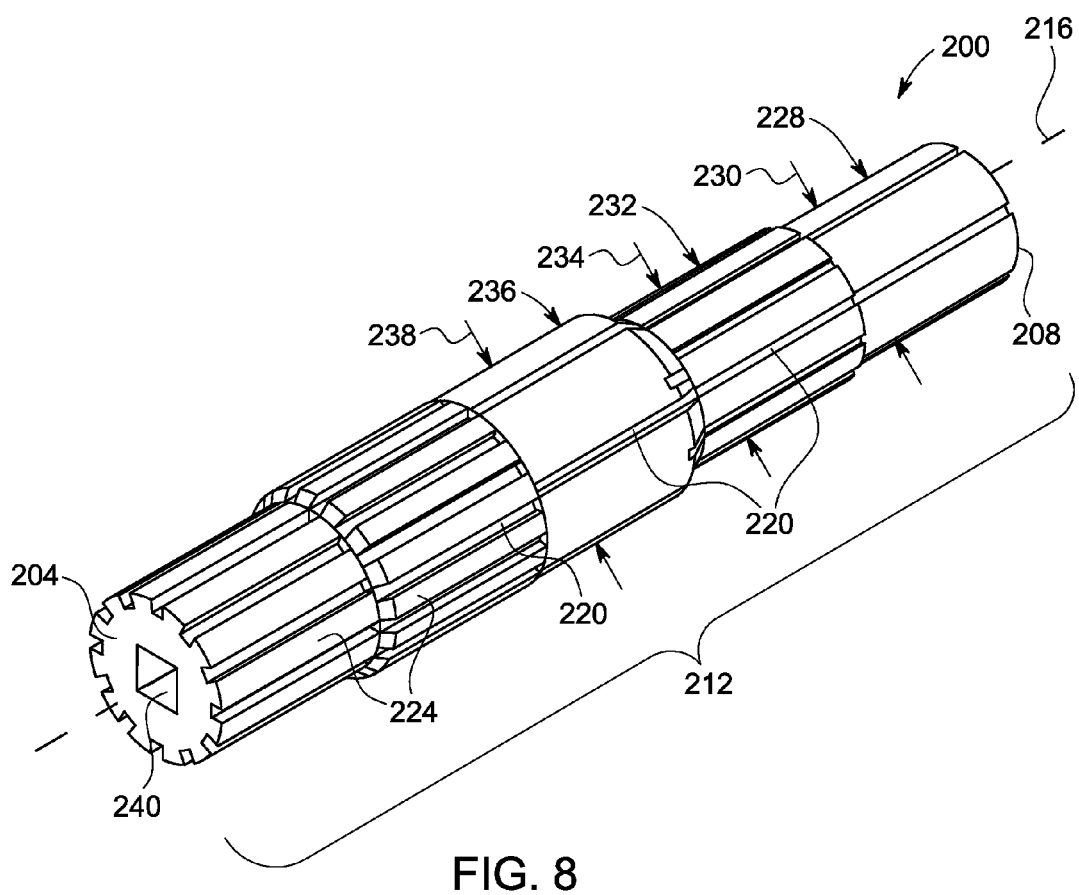
FIG. 8 is a perspective view of the second tool of FIG. 7.
Figure 9:
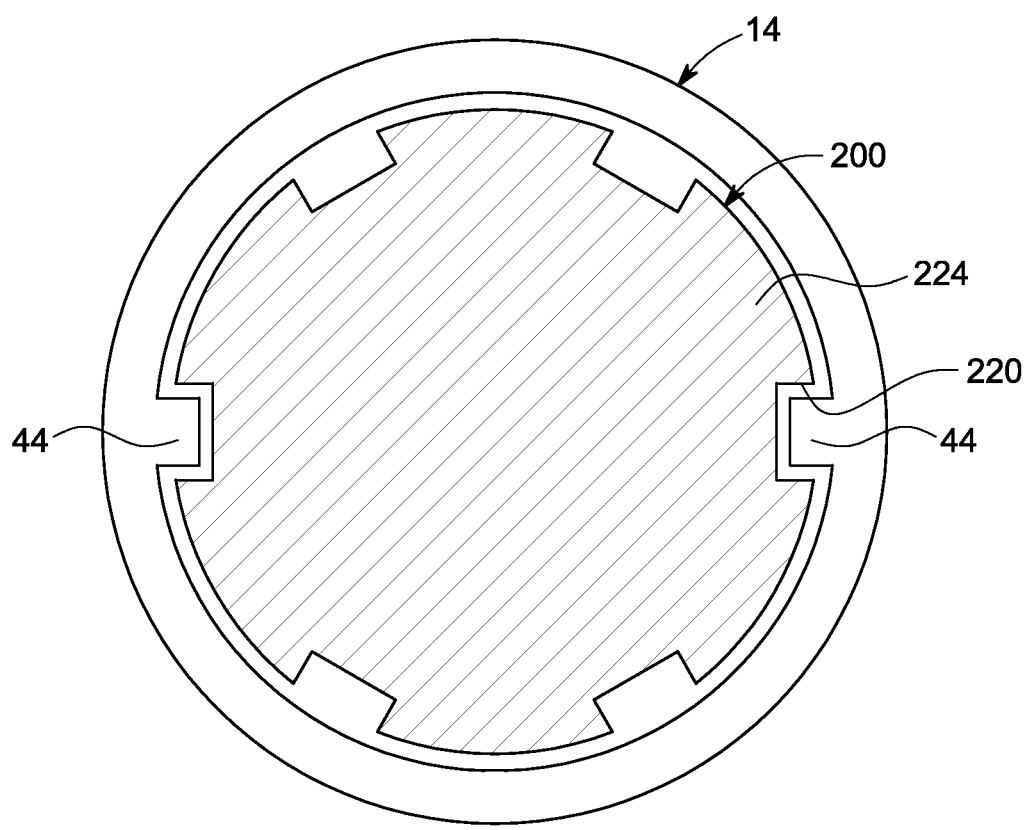
FIG. 9 is a sectional view of the outer casing and second tool along the line 9-9 of FIG. 7.
Figure 10:
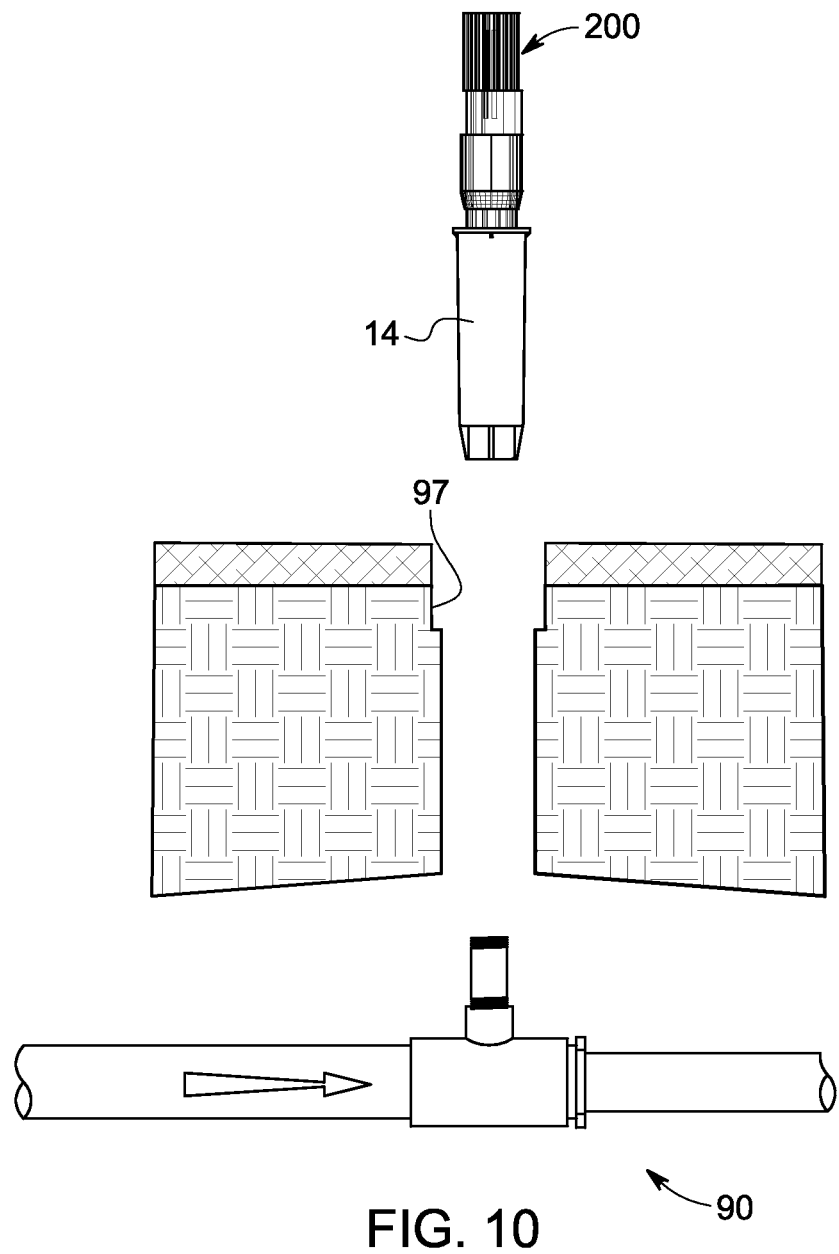
FIG. 10 is a side view of the outer casing of the pop-up sprinkler head similar to that in FIG. 7 but illustrating the second tool being used to remove the outer casing from fluid interconnection with the water line and from the ground.

With reference to FIG. 8, the second tool 200 may generally include first and second opposed ends 204, 208 and an outer surface 212 extending between the first and second opposed ends 204, 208 that is configured to contact the inner surface 38 of the outer casing 14 so as to induce rotation of the outer casing 14 upon rotation of the second tool 200. Stated differently, upon insertion of the first or second end 204, 208 of the second tool 200 into the interior cavity 46 of the outer casing 14 (e.g., as in FIG. 7), subsequent rotation of the second tool 200 about a central or rotational axis 216 of the second tool 200 while maintaining contact between the outer surface 208 of the second tool 200 and the inner surface 38 of the outer casing 14 may induce a corresponding rotation of the outer casing 200 relative to the irrigation system 90 and the ground 92. Continued rotation in one direction (e.g., counterclockwise) may eventually serve to disconnect the outer casing 14 from the riser tube 49 and/or T-joint 54. See FIG. 10. For instance, the second tool 200 may have an overall generally cylindrical shape to generally match that of the outer casing 14.

In one arrangement, the outer surface 212 of the second tool 200 may include one or more engagement features thereon or therein that are adapted to interlock or otherwise engage with or contact one or more corresponding engagement features on the inner surface 38 of the outer casing 14 so as to restrict relative rotation between the second tool 200 and the outer casing 14. For instance, and turning to FIGS. 8-9, the outer surface 212 may include one or more openings such as grooves 220 (e.g., channels, slots, etc.) that are respectively configured (e.g., sized, shaped, oriented) to receive or otherwise engage with one or more corresponding projections extending along the inner surface 38 of the outer casing 14 such as the one or more fins 44. As shown, the grooves 220 may generally extending along a length of the outer surface 212 at least partially between the first and second ends 204, 208 and generally parallel to the rotational axis 216 of the second tool so that at least some of the grooves 220 are designed to receive at least some of the fins 44 of the outer casing 14. In this regard, an operator may grasp the second tool 200, align at least some of the grooves 220 with at least some of the fins 44, insert (e.g., slide) the second tool 200 at least partially into the interior cavity 46 of the outer casing 14, and then torque the second tool 200 so as to engage the grooves 220 and fins 44 and induce a corresponding rotation of the outer casing 14.

As shown, the outer surface 212 of the second tool 200 may also include one or more projections such as splines 224 (e.g., ribs) disposed in an alternating arrangement with the grooves 220 and extending along a length thereof at least partially between the first and second ends 204, 208. The splines 224 may be naturally formed by virtue of appropriately forming the grooves 220 in the outer surface 212 and/or may be intentionally formed along the outer surface 212. In any case, the splines 224 may be configured to engage with corresponding openings or grooves (not labeled) in or on the inner surface 38 of the outer casing 14 (e.g., which may be naturally formed by virtue of forming the fins 44 and/or may be intentionally formed).

The second tool 200 may in some arrangements be configured to engage with the inner surface 38 of a wide variety of outer casings 14. For instance, the second tool 200 may be able to engage with and induce rotation of a plurality of outer casings 14 having various different (e.g., inner) diameters. In one arrangement, and with specific reference to FIG. 8, the second tool 200 may have a plurality of portions or sections extending along the length of the outer surface 212 such as, for example, first, second and third portions 228, 232, 236 having respective sub-lengths of the overall length of the second tool 200. Each of the first, second and third portions 228, 232, 236 may be differently configured so as to engage with correspondingly differently configured outer casings 14.

For instance, the first, second and third portions 228, 232, 236 may have different respective outer diameters 230, 234, 238 extending along a substantial entirety of each of their sub-lengths so as to engage with corresponding outer casings 14 having similarly sized inner diameters. Additionally or alternatively, the first, second and third portions 228, 232, 236 may have different configurations (e.g., sizing, spacing, arrangements, etc.) of grooves 220 and/or splines 224 (e.g., different "keys") to allow for engagement with corresponding different arrangements of grooves and splines (e.g., or other types of openings and projections) on the inner surface 38 of different outer casings 14. In this regard, an operator may insert the second tool 200 into the interior cavity 46 of a particular outer casing 14 until the outer surface 212 of one of the various portions of the second tool 200 engages with the inner surface 38 of the outer casing 14, at which point the operator may torque the second tool 200 to induce rotation of the outer casing 14. Various other arrangements of the second tool 200 to allow for engagement with a wide variety of outer casings are envisioned and encompassed within the present teachings.

Like the first tool 100, the second tool 200 may in some arrangements include a tool engaging feature or element such as socket 240 disposed in one or both of the first and second ends 204, 208 that is configured (e.g., sized, shaped, positioned) to receive a corresponding tool such as a wrench or the like to facilitate torquing of the second tool 200. Other types of rotational or torque facilitating features are also envisioned such as handles and the like.

Figure 11:
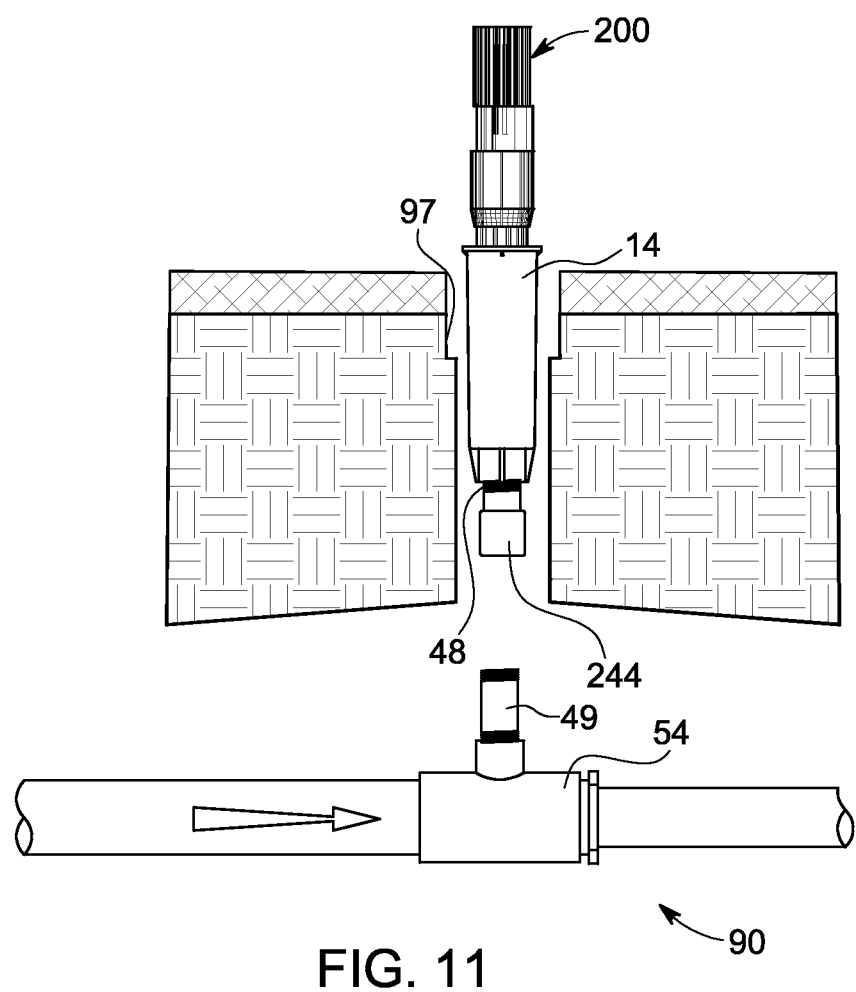
FIG. 11 is a side view of the outer casing of the pop-up sprinkler head similar to that in FIG. 9 but illustrating a riser tube being fluidly interconnected to an inlet of the outer casing.
Figure 12:
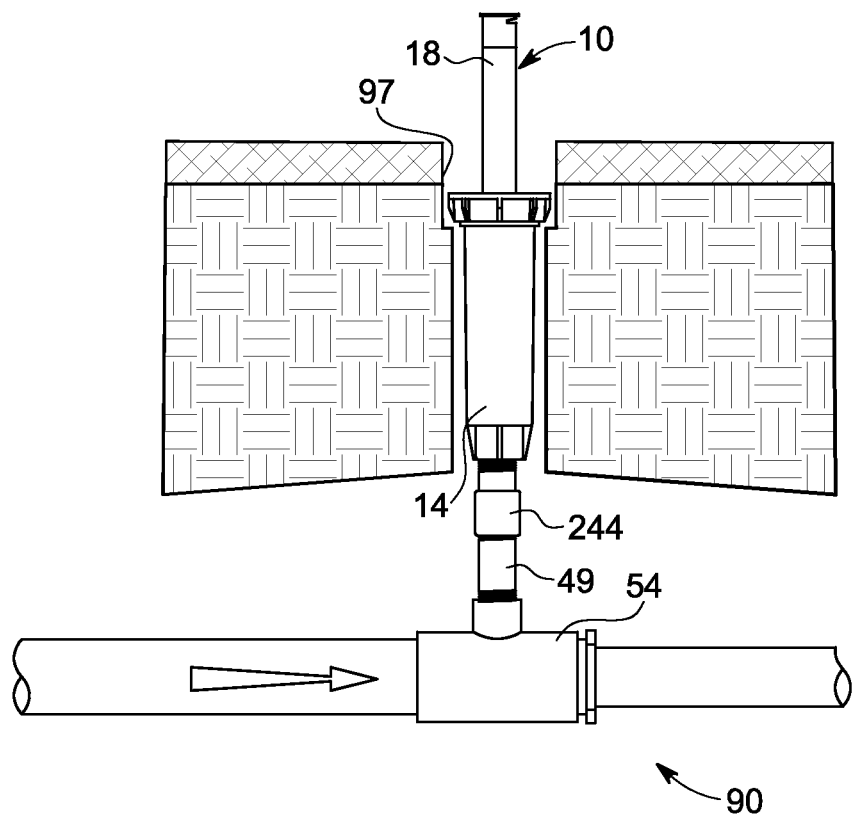
FIG. 12 is a side view of the outer casing of the pop-up sprinkler head similar to that in FIG. 10 but illustrating the outer casing being fluidly interconnected to the water line via the riser tube and the inner housing being slidably secured within the outer casing via the retaining cap.

Upon removal of the outer casing 14 from the ground 92, any appropriate tasks may be performed in relation to the sprinkler head 10, irrigation system 90, and/or the like. For instance, and turning to FIG. 11, one or more additional riser tubes 244 may be secured (e.g., threadably) to the inlet 48 of the outer casing 14, to any existing riser tubes 49, and/or to the T-joint 54 of the irrigation system 90. Once any desired tasks have been performed, the second tool 200 may be inserted into the interior cavity 46 of the outer casing 14 and used to rethread or otherwise re-secure the outer casing 14 (and any additional riser tube(s) 244) to the irrigation system 90 (e.g., to any existing riser tubes 49, T-joint 54, etc.), such as by rotating the second tool 200 in a direction (e.g., a clockwise direction) opposite from that used to unthread and remove an outer casing 14 from the ground 92.

In one arrangement, the inner housing 18 may then be inserted into the interior cavity 46 of the outer casing 14 and the first tool 100 may be used to rethread the retaining cap over the first end 26 of the outer casing 14 so as to again prevent or limit removal of the inner housing 18 from the outer casing while allow for sliding movement of the inner housing 18 within the interior cavity 46 of the outer casing 14. Upon application of a water pressure, the nozzle 86 of the sprinkler head 10 may now be configured to protrude or otherwise extend to a distance above the top 96 of the lawn 94 or garden that is higher than before addition of the additional riser tube(s) 244 so as to achieve an improved water coverage of the lawn 94, garden or the like.

In one arrangement, a maximum cross-dimension (e.g., outer diameter) of the second tool 200 adjacent the first end 204 may be at least about ¾", such as at least about 1"; and/or may be no more than about 1¾", such as no more than about 1½". In another arrangement, a maximum cross-dimension of the second tool 200 adjacent the second end 208 may be at least about ½", such as at least about ¾"; and/or may be no more than about 1½", such as no more than about 1¼". In a further arrangement, a length of the second tool 200 (e.g., as measured along rotational axis 216 from the first end 204 to the second end 208) may be at least about 5", such as at least about 6", or at least about 7"; and/or no more than about 10", such as no more than about 9", or no more than about 8".

In another arrangement, a maximum cross-dimension of the second tool 200 adjacent the first end 204 may be at least about 1½", such as at least about 1¾"; and/or may be no more than about 2¼", such as no more than about 2". In a further arrangement, a maximum cross-dimension of the second tool 200 adjacent the second end 208 may be at least about 2", such as at least about 2½"; and/or may be no more than about 3¼", such as no more than about 3". In a still further arrangement, a length of the second tool 200 may be at least about 8", such as at least about 9", or at least about 10"; and/or no more than about 13", such as no more than about 12", or no more than about 11".

The first and/or second tools 100, 200 (and in some arrangement, any additional desired tools) may be included as part of a kit for use by sprinkler operators, technicians, personnel, and/or the like. For instance, an operator could bring a kit including the first and second tools 100, 200 to an area (e.g., lawn, garden, field, etc.) having a possibly large number of sprinkler heads 10, at least some of which need repositioning (e.g., rising), repair, replacement and/or the like. In one arrangement, the operator could use the first tool 100 to systematically remove at least the retaining cap 22 and inner housing 18 of a plurality of the sprinkler heads 10, and then use the second tool 200 to remove the outer casings 18 of any sprinkler heads 10 that were not removed using the first tool 100. After performing any necessary tasks (e.g., adding riser tubes 244, performing repairs, etc.), the operator could then use the first and second tools 100, 200 to systematically reinstall the sprinkler heads 10 (and/or any replacement sprinkler heads 10) into the ground 92 so as to fluidly interconnect the sprinkler heads with the irrigation system. Of course, an operator could also use both the first and second tools 100, 200 on each particular sprinkler head 10 before moving onto a subsequent sprinkler head 10. If necessary, the operator may turn on the water in the irrigation system either before or after installing the outer casings 14 (but before installing the inner housings 18 and retaining caps 22) to eliminate any debris (e.g., dirt, rocks, etc.) that may have entered the irrigation system 90 during the removal, repositioning, repair, replacement, etc. of the sprinkler heads 10.

The tools disclosed herein (e.g., the first and/or second tools 100, 200) may be constructed or otherwise formed of any appropriate materials. As just one example, one or more components of the first and/or second tools may be injection molded from materials such as nylon, acrylonitrile butadiene styrene (ABS), polyvinyl chloride (PVC)(e.g., schedule 80 rating), polypropylene, high density polyethylene (HDPE), and the like.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments and/or arrangements can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A kit, comprising:
    an apparatus for use with a sprinkler head mountable at least partially within the ground, the sprinkler head having an outer casing, an inner tubular housing slidably mountable within the outer casing, and a retaining cap securable to the outer casing to limit separation of the inner housing from the outer casing, wherein the apparatus comprises:
        a body having a first end, an opposed second end, an inner surface, and a substantially hollow cavity inside the inner surface, wherein a minimum cross-dimension of the body increases along at least a portion of a length of a rotational axis of the apparatus in a direction towards the second end, and wherein the minimum cross-dimension extends from one point on the inner surface to an opposing point on the inner surface; and
        a tool engaging element disposed adjacent the first end, wherein the cavity is operable to receive the retaining cap via the second end and allow the retaining cap to contact the inner surface at a location disposed between the first and second ends so that rotation of the apparatus about the rotational axis via the tool engaging element effects rotation of the retaining cap; and
    a tool having a first end, an opposed second end, and an outer surface having a length that extends between the first and second ends, wherein the outer surface of the tool is configured to be inserted into an inner cavity of the outer casing and contact an inner wall of the outer casing so that rotation of the tool about a rotational axis of the tool effects rotation of the outer casing;
    wherein the outer surface comprises at least first and second portions along the length, wherein the first portion comprises a first maximum cross-dimension that extends from one point on the first portion of the outer surface to an opposite second point on the first portion of the outer surface, and wherein the second portion comprises a second maximum cross-dimension that extends from one point on the second portion of the outer surface to an opposite second point on the second portion of the outer surface, and wherein the second maximum cross-dimension is different than the first maximum cross-dimension;
    wherein the first portion comprises a first sub-length and the second portion comprises a second sub-length, wherein the first maximum cross-dimension extends along a substantial entirety of the first sub-length, wherein the second maximum cross-dimension extends along a substantial entirety of the second sub-length, and wherein the first and second sub-lengths are non-overlapping along the length of the tool; and
    wherein the first portion of the outer surface of the tool includes a plurality of alternatingly arranged projections and openings along a substantial entirety of the first sub-length that are respectively configured to engage with a plurality of alternatingly arranged openings and projections on the inner wall of the outer casing, wherein the second portion of the outer surface of the tool includes a plurality of alternatingly arranged projections and openings along a substantial entirety of the second sub-length that are respectively configured to engage with a plurality of alternatingly arranged openings and projections on an inner wall of a second outer casing, and wherein a distance between adjacent projections of the first portion is different than a distance between adjacent projections of the second portion.

2. The kit of claim 1, further comprising: a cutting member disposed adjacent the second end of the body, wherein rotation of the apparatus about the rotational axis of the apparatus via the tool engaging element is configured to effect cutting of the ground surrounding the sprinkler head with the cutting member.

3. The kit of claim 2, wherein the cutting member comprises a blade.

4. The kit of claim 2, wherein the cutting member is disposed about a substantial periphery of the body adjacent the second end.

5. The kit of claim 1, wherein at least one of the openings comprises a groove.

6. The kit of claim 5, wherein at least one of the projections comprises a spline.

7. The kit of claim 1, wherein the minimum cross-dimension of the body increases along the length of the rotational axis from the first end to the second end.

8. The kit of claim 1, wherein the inner surface comprises a gripping component for limiting movement of the apparatus relative to the retaining cap.

9. The kit of claim 1, wherein the tool engaging element comprises at least one of a socket sized to receive a tool and a handle.

10. The kit of claim 1, wherein the body comprises a substantial conical shape.

11. The kit of claim 1, wherein the tool is substantially cylindrical.

12. The kit of claim 1, wherein at least one of the first and second ends of the tool comprises a tool engaging element.

* * * * *